United States Patent [19]

Kashida et al.

[11] Patent Number: 4,811,120
[45] Date of Patent: Mar. 7, 1989

[54] INFORMATION SIGNAL RECORDING AND/OR REPRODUCING APPARATUS

[75] Inventors: Motokazu Kashida; Susumu Kozuki, both of Tokyo; Hiroyuki Takimoto, Kanagawa; Kouji Takahashi, Kanagawa; Kenichi Nagasawa, Kanagawa, all of Japan

[73] Assignee: Canon Kabushiki Kaisha, Tokyo, Japan

[21] Appl. No.: 830,958

[22] Filed: Feb. 19, 1986

[30] Foreign Application Priority Data

Feb. 22, 1985 [JP] Japan ................................. 60-34779
Feb. 25, 1985 [JP] Japan ................................. 60-35610
Feb. 25, 1985 [JP] Japan ................................. 60-35611

[51] Int. Cl.$^4$ ............................................. H04N 5/78
[52] U.S. Cl. ........................................ 37/5; 360/38.1; 360/32; 360/77.12; 360/19.1; 358/343; 371/67
[58] Field of Search ................. 360/19.1, 38.1, 31, 360/77, 70, 32; 358/343; 369/53; 371/5

[56] References Cited

U.S. PATENT DOCUMENTS

| 4,070,647 | 1/1978 | Gibson | 371/5 |
| 4,446,488 | 5/1984 | Suzuki | 358/343 |
| 4,473,850 | 9/1984 | Foerster | 360/19.1 |
| 4,558,378 | 12/1985 | Shibata | 360/19.1 |
| 4,575,772 | 3/1986 | Shimada | 360/19.1 |
| 4,583,132 | 4/1986 | Nakano | 360/19.1 |

Primary Examiner—Aristotelis M. Psitos
Attorney, Agent, or Firm—Robin, Blecker & Daley

[57] ABSTRACT

An information signal recording and/or reproducing apparatus for recording and/or reproducing signals with transducing means in or from a given area on a recording medium is arranged to detect by using the transducing means the presence of an existing record of either a first information signal which includes a video signal or a second information signal which includes an audio signal in the given area and to be capable of finding any record of the first information signal by detecting the record of the second information signal.

24 Claims, 13 Drawing Sheets

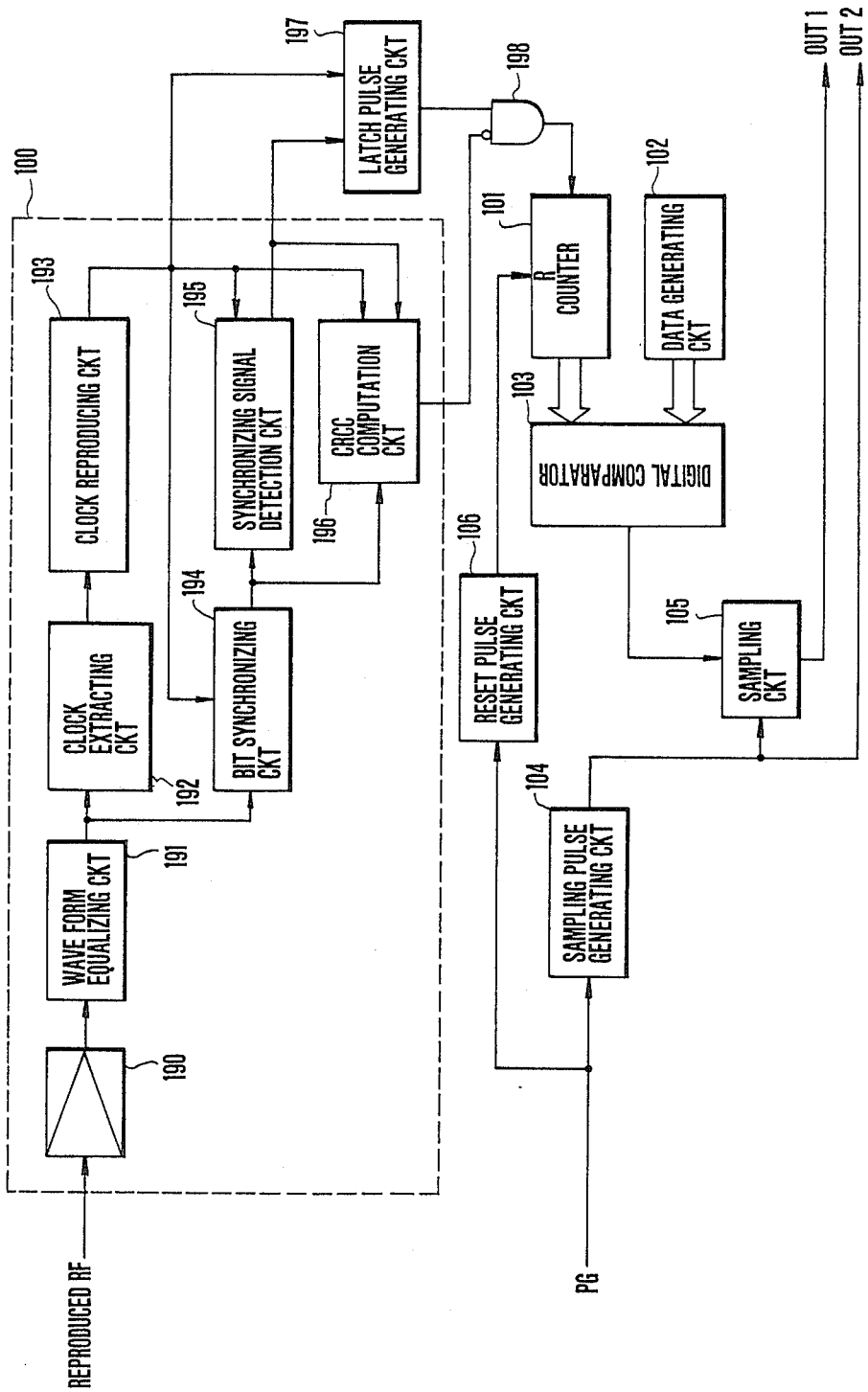
F I G. 13

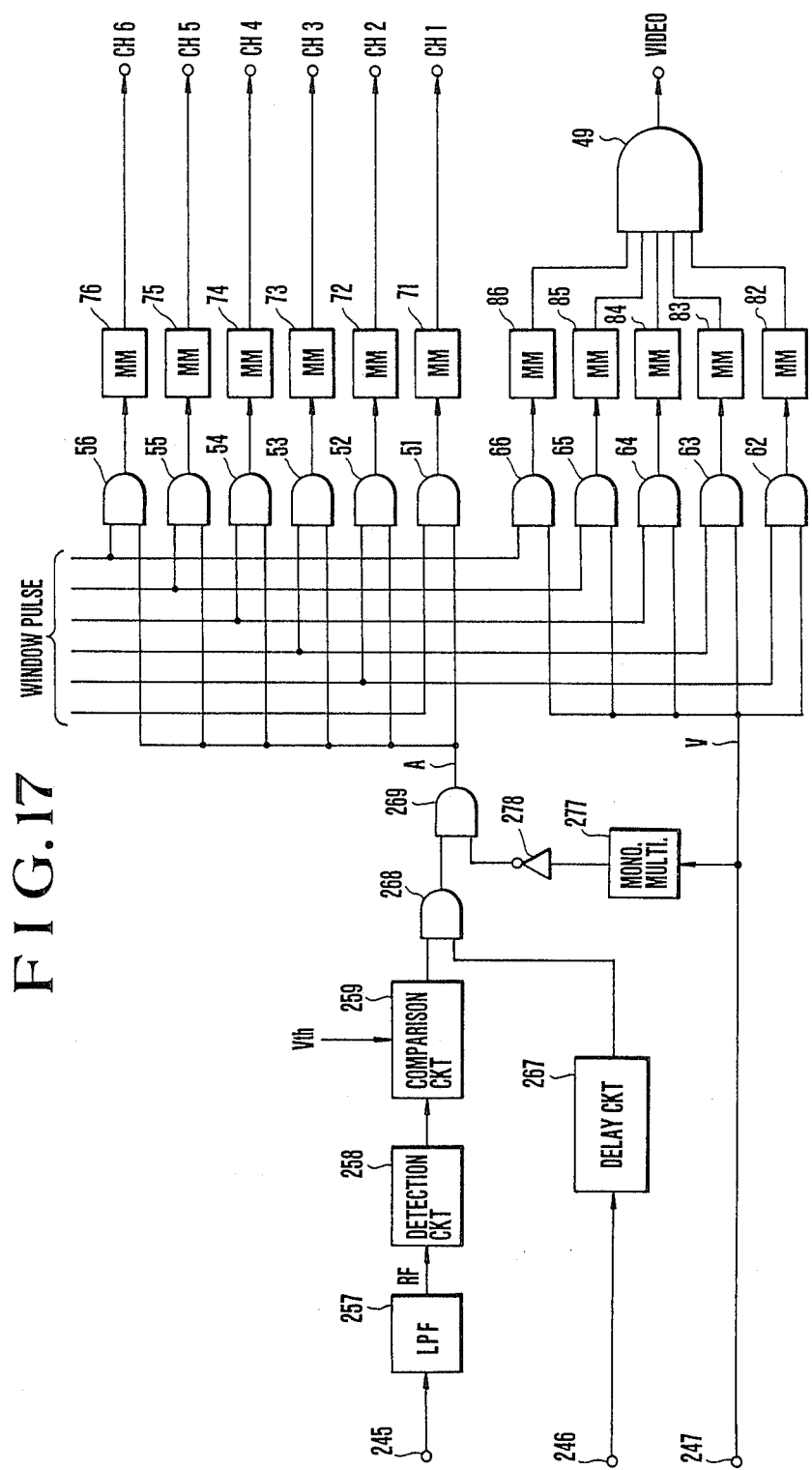
F I G. 17

INFORMATION SIGNAL RECORDING AND/OR REPRODUCING APPARATUS

BACKGROUND OF THE INVENTION

1. Field of the Invention

This invention relates to an information recording and/or reproducing apparatus and more particularly to an apparatus arranged to selectively record or reproduce information signals of different kinds.

2. Description of the Prior Art

High density recording has recently become a subject of pursuit in the field of magnetic recording. Video tape recorders (hereinafter referred to as VTR's) also have become capable of performing magnetic recording to a higher degree of density with the travelling speed of the tape lowered. Therefore, the conventional arrangement of using a fixed head for audio signal recording does not give a sufficiently high relative speed and thus results in the degradation of reproduced sound quality. In one of the solutions of this problem, the recording tracks formed by a rotary head are lengthened to have audio signals which are compressed on the time base recorded in the lengthened portion of the recording tracks one after another.

In the case of a VTR of the two-rotary-head helical scanning type, for example, a magnetic recording tape has been arranged to be lapped at least 180 degrees around a rotary cylinder. Then, a VTR of this type has been contrived, according to the above-stated solution, wherein the magnetic recording tape is lapped at least $(180+\theta)$ degrees around the rotary cylinder; and time base compressed audio signals which are pulse code modulated are recorded in the additional portion of $\theta$ degree. FIG. 1 of the accompanying drawings schematically shows the tape transport system of the above-stated VTR. FIG. 2 shows recording tracks formed on a magnetic tape by the VTR of FIG. 1. The illustration includes a magnetic tape 1; a rotary cylinder 2; heads 3 and 4 which are mounted with a phase difference of 180 degrees on the cylinder 2 and have different azimuth angles from each other; video signal recording areas 5 formed on the tape 1; and audio signal recording areas 6 formed also on the tape 1. Each of the video areas 5 is formed with the 180 degree lapped portion of the tape 1 on the rotary cylinder 2 traced by the heads 3 and 4. Each of the audio areas 6 is formed with the angle $\theta$ degree portion of the tape lapped on the cylinder 2 traced by the heads 3 and 4. In FIG. 2, reference symbols f1 to f4 represent the frequency values of tracking pilot signals superimposed on the recording tracks in accordance with a known four frequency method. The frequency values of these pilot signals are in the following relation: $f2-f1=f3-f4 \approx fH$ and $f4-f2 \approx 2fH$, wherein fH represents the horizontal scanning frequency of the video signal.

With the audio signal which is compressed on the time base and is pulse code modulated (hereinafter referred to as PCM processed) recorded in the audio areas, the audio signal can be reproduced with a high sound quality, which is comparable with the quality attainable by an audio apparatus which is adapted specially for recording and reproduction of an analog signal.

Meanwhile, there has been proposed a method of recording additional audio signals also in the video areas 5 of the VTR of the above-stated type. This method is as follows: Assuming that the angle $\theta$ is arranged to be $\theta=36$, five additional audio areas are obtainable with the rotary head roated 180 degrees. Then, an arrangement to have time-base compressed audio signals recorded independently in these areas enables audio signals to be recorded in six channels. Thus, an audio dedicated or appropriated tape recorder can be arranged to be capable of recording audio signals in six channels. The following briefly describes this tape recorder:

FIG. 3 shows the tape transport system of the above-stated tape recorder. FIG. 4 shows recording tracks formed on a tape by this tape recorder. The same reference numerals and symbols are used as in FIGS. 1 and 2. While the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein respectively. An operation called azimuth-overwrite is performed on these areas. However, the tracks of these are CH1-CH6 do not have to be on the same straight line. Each of the areas CH1-CH6 has one pilot signal recorded therein for tracking control. Different pilot signals are thus recorded in different areas in the order of rotation f1→f2→f3→f4. However, there is no correlation between them.

Referring further to FIG. 3, recording or reproduction is carried out in or from these areas CH1 to CH3 while the tape 1 is travelling at a predetermine speed in the direction of arrow 7 and in or from the areas CH4 to CH6 while the tape is travelling in the direction of arrow 9. Therefore, as shown in FIG. 4, the inclination of the areas CH1 to CH3 somewhat differs from that of the areas CH4 to CH6. With regard to a difference in the relative speed of the tape and the head for these groups of areas, a difference arising from the travel of the tape 1 is extemely small as compared with a difference arising from the rotation of the heads 3 and 4. Therefore, the difference in the relative speed presents no problem.

FIGS. 5(a) to 5(j) show in a time chart the recording or reproducing operation of the tape recorder which is arranged as described above. A phase detection pulse (hereinafter referred to as a PG signal) which is generated in synchronism with the rotation of the cylinder 2 as shown at FIG. 5(a). The PG signal is of a rectangular wave of 30 Hz repeating a high level (hereinafter referred to as an H level) and allow level (hereinafter referred to as an L level) alternately with each other at intervals of 1/60 sec. Another PG signal which is of the opposite polarity to the PG signal of FIG. 5(a) is shown in FIG. 5(b). The first PG signal is at an H level while the head 3 is rotating from the point B to the point G of FIG. 3. The other PG signal shown in FIG. 5(b) is at an H level while the other head 4 is rotating from the point B to the point G.

Pulses for reading data are obtained from the PG signal of FIG. 5(a) as shown in FIG. 5(c). The data reading pulses are used for sampling the audio signal of a period corresponding to one field (1/60 sec). FIG. 5(d) shows by H level parts thereof periods provided for signal processing on the one field portion of the sampled audio data by adding an error correcting redundant code or by changing the arrangement thereof by means of a RAM or the like. FIG. 5(e) shows a signal indicating data recording periods at H level parts thereof which represent timing for recording, on the tape 1, the recording data obtained through the signal processing operation mentioned above.

Referring to FIGS. 5(a) to 5(j), the temporal flow of signals are, for example, as follows: The data sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time 56, or while the head 3 is moving from the point A to the point B. In other words, the data is recorded by the head 3 in the area CH1 as shown in FIG. 4. Meanwhile, the data which is sampled while the PG signal of FIG. 5(b) is at an H level is also processed at a similar timing before it is recorded in the area CH1 by the head 4.

FIG. 5(f) shows another PG signal which is obtained by shifting the phase of the PG signal of FIG. 5(a) to a predetermined degree, which corresponds to one area and is 36 degrees in this specific instance.

An audio signal recording operation using the PG signal of FIG. 5(f) and a PG signal which is not shown but is of an opposite polarity to the former is performed in the following manner: The data which is sampled during a period between the points of time t2 and t4 is subjected to a signal processing operation during a period between the points of time t4 and t6 in accordance with the signal of FIG. 5(g) and is recorded during a period between the points of time t6 and t7 in accordance with the signal of FIG. 5(h). In other words, the data is recorded in the area CH2 of FIG. 4 while the head is moving from the point B to the point C. Meanwhile, another data which is sampled during the points of time t4 and t7 is likewise recorded in the area CH2 by means of the other head during a period between the points of time t4 and t7.

The signal which is recorded in the area CH2 in the manner as described above is reproduced in the following manner:

The head 3 reads the data from the tape 1 in accordance with a signal shown in FIG. 5(h) during the period between the points of time t6 and t7 (and also during the period between the points of time t1 and t2). Then, during the period between the points of time t7 and t8 also (between t2 and t3), the reproduced signal is subjected to a signal processing operation which is carried out, in a manner reverse to the signal processing operation performed for recording, in accordance with a signal shown in FIG. 5(i). In other words, error correction and other processes are carried out during this period. Then, during a period between points of time t8 and t9, the reproduced audio signal which has been thus processed is produced in accordance with a signal shown in FIG. 5(j). The reproducing operation of the head 4 is of course performed with a phase difference of 180 degrees from the above-stated reproduction by the head 3, so that a continuous reproduced audio signal can be obtained.

For other areas CH3 to CH6, it goes without saying that the recording and reproducing operation are performed on the basis of the PG signal of FIG. 5(a) by phase shifting it as much as n×36 degrees. This is independent of the travelling direction of the tape.

The prior art arrangement described above thus permits use of a VTR as an apparatus of multiple channel arrangement adapted solely for audio signal recording and/or reproduction.

The apparatus which is arranged as described above is capable of recording the audio signal over an extemely long period of time. However, an inaccurate grasp of the recording condition would increase the probability of an erroneous operation. In other words, there are recorded and unrecorded parts of the audio signal in each of the channels. Besides, a video signal might be recorded in the areas CH2 to CH6. In some cases, some part of a video signal might be left unerased. These things make it difficult to accurately grasp the actual record condition. If a video signal is erroneously recorded on the recording medium which is in such a condition, all the audio signals that have been recorded in the areas CH2 to CH5 might be completely erased. Further, if an audio signal happens to be recorded in any of the areas CH2 to CH5 of a recording medium on which a video signal has been recorded, the video signal would be nullified by the audio signal recording.

SUMMARY OF THE INVENTION

It is a principal object of this invention to provide an information signal recording and/or reproducing apparatus which eliminates the above-stated shortcoming of the prior art apparatus.

It is an object of this invention to provide an information signal recording and/or reproducing apparatus which is capable of grasping the situation or the existing state of a given area on a recording medium for recording information signals of different kinds.

It is another object of this invention to provide an information signal recording and/or reproducing apparatus which is capable of accurately grasping the situation of a given area on a recording medium as to the presence of a recorded video signal, that of a recorded audio signal or having no recorded signal there.

Under this object, an information signal recording and/or reproducing apparatus arranged as an embodiment of this invention comprises: Transducing means for recording and/or reproducing a signal in or from a given area on a recording medium; first detecting means for detecting, by using the transducing means, an existing record of either a first information signal which includes a video signal or a second information signal which includes an audio signal within the given area; second detecting means for detecting, by using the transducing means, any existing record of the second information signal; and means for determining the situation of the given area as to the presence or absence of any previous record of the first information signal on the basis of the output of the first detecting means and that of the second detecting means.

It is a further object of this invention to provide an information signal recording and/or reproducing apparatus which is capable of detecting an existing record of a digital information signal without having any identification signal additionally recorded on the recording medium.

Under this object, an information signal recording and/or reproducing apparatus arranged as another embodiment of this invention comprises: transducing means for recording and/or reproducing an information signal in or from a given area on a recording medium, the information signal including digital information consisting of main information data and error correcting redundant data; error detecting means for detecting by using said redundant data any code error of the digital information included in the information signal when the signal is reproduced by the transducing means; and determining means for determining, by using the output of the error detecting means, the presence of any existing record of the information signal.

It is a still further object of this invention to provide an information signal recording and/or reproducing apparatus which is capable of reliably detecting the presence of an existing record of a video signal without having any identification signal additionally recorded on the recording medium.

Under that object, a video signal recording and/or reproducing apparatus arranged as a further embodiment of this invention comprises: transducing means for recording and/or reproducing a video signal in or from a given area on a recording medium; detecing means for detecing horizontal synchronizing signals included in the video signal reproduced by the transducing means; counting means for counting the horizontal synchronizing signals detected by the detecting means; storing means for storing information on the number of the horizontal synchronizing signals counted by the counting means within a given period of time; and determining means for determining the presence or absence of the existing record of the video signal in the given area on the basis of the information stored by the storing means.

These and further objects and features of this invention will become apparent from the following detailed description of preferred embodiments thereof taken in connection with the accompanying drawings.

BRIEF DESCRIPTION OF THE DRAWINGS

FIG. 12 shows in outline the arrangement of a tape recorder arranged as another embodiment of this invention.

FIG. 17 is a circuit diagram showing by way of example the details of a record condition determining circuit included in the embodiment shown in FIG. 15.

DETAILED DESCRIPTION OF THE PEFERRED EMBODIMENTS

Figure 7:
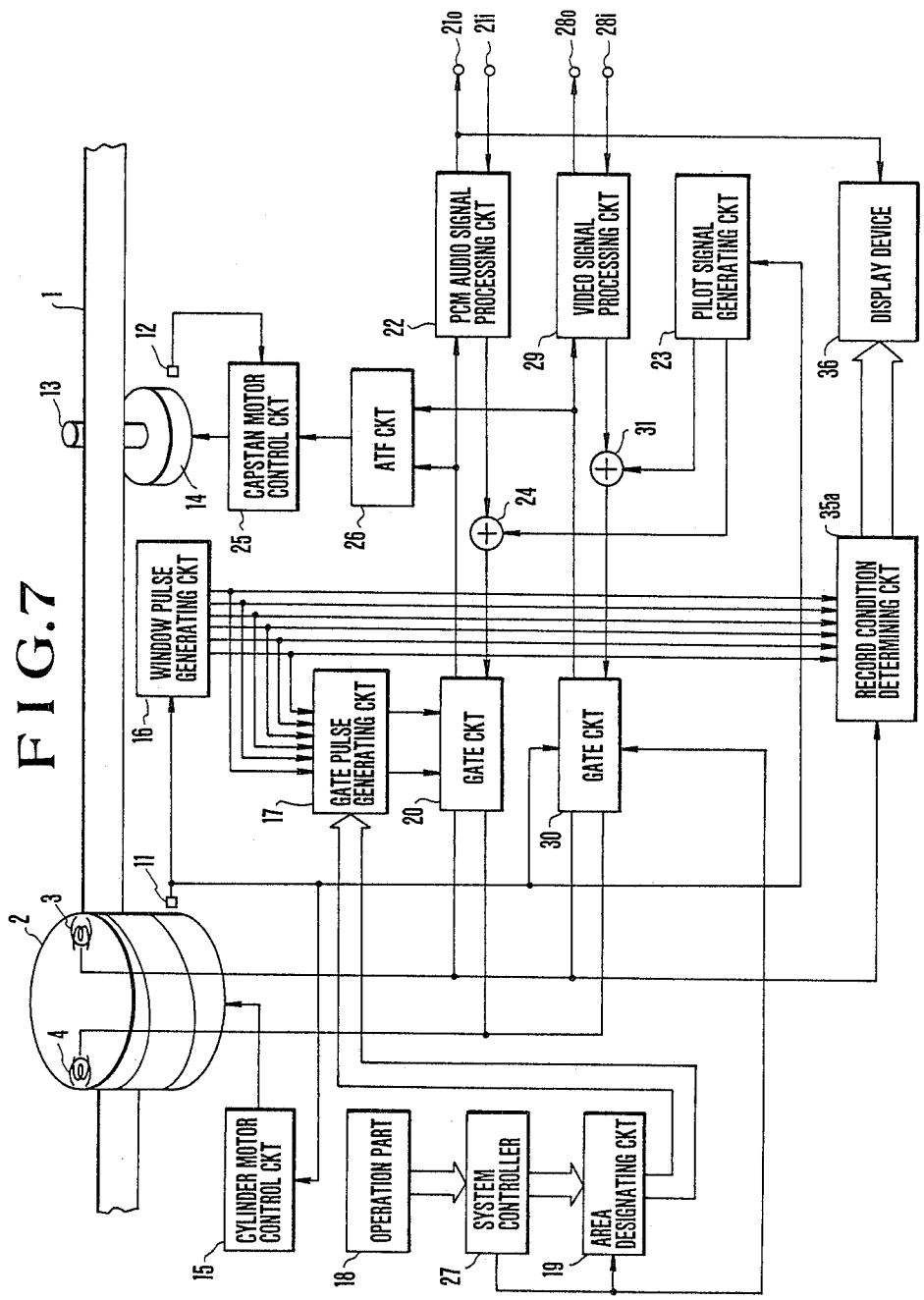
FIG. 7 is a diagram showing in outline the arrangement of a tape recorder arranged as an embodiment of this invention.

FIG. 7 shows in outline the arrangement of a tape recorder embodying this invention. In FIG. 7, the component elements which are similar to those shown in FIGS. 1 to 4 are indicated by the same reference numerals.

The PG signal which is obtained from a detector 11 detecting the rotation of a rotary cylinder 2 is supplied to a cylinder motor control circuit 15. The circuit 15 then causes the cylinder 2 to be rotated at a given rotation speed and at a given rotation phase. A rotation detector 12 is arranged to detect the rotation of the fly-wheel 14 of a capstan 13. The output of the rotation detector 12 is supplied to a capstan motor control circuit 25. The circuit 25 controls the capstan 13 to have it rotate at a given rotation speed for recording.

Figure 1:
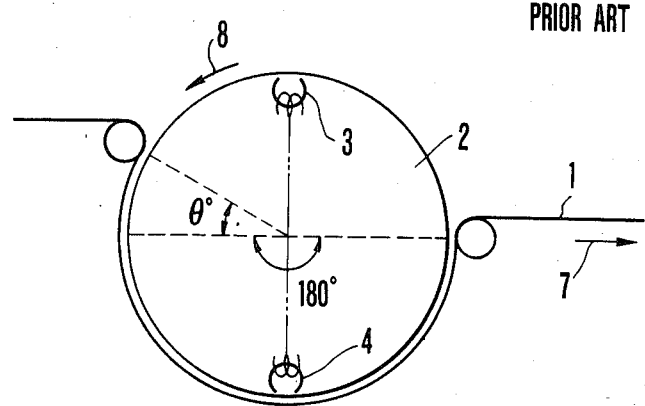
FIG. 1 is an illustration of the tape transport system of the conventional VTR.
Figure 2:
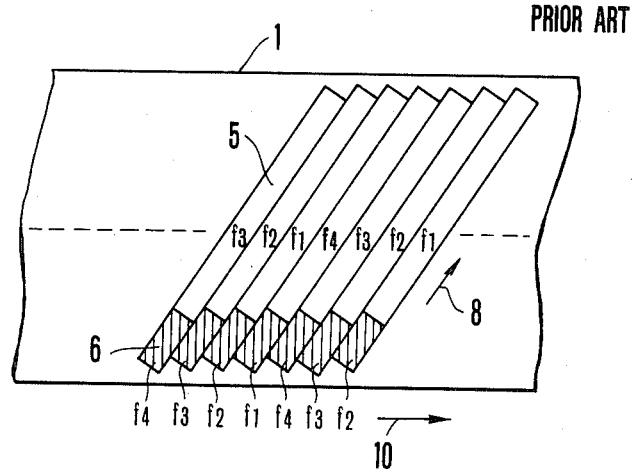
FIG. 2 is an illustration of recording loci formed by the VTR of FIG. 1 on a magnetic tape.
Figure 3:
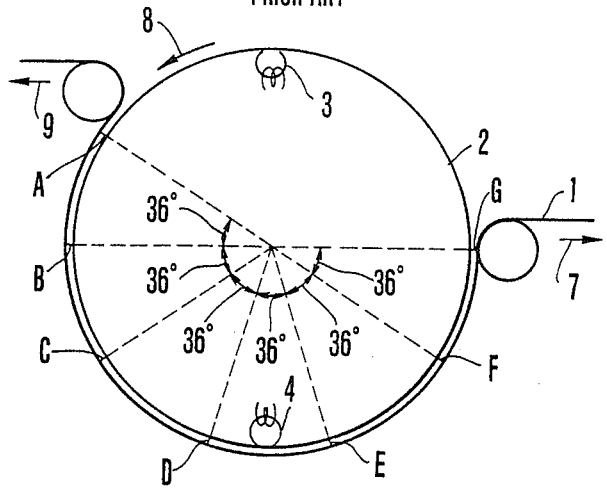
FIG. 3 is an illustration of the tape transport system of a multi-channel tape recorder.
Figure 4:
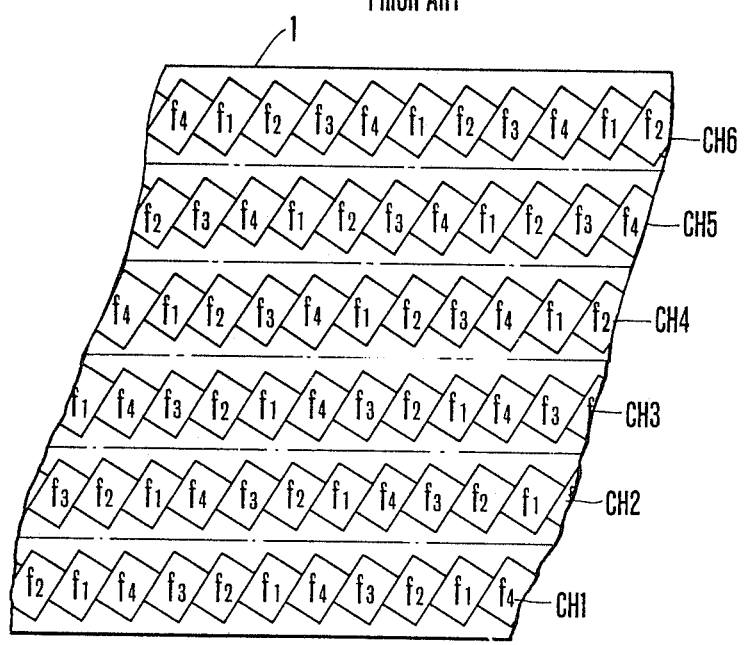
FIG. 4 is an illustration of recording loci formed by the tape recorder of FIG. 3 on a magnetic tape.
Figure 5:
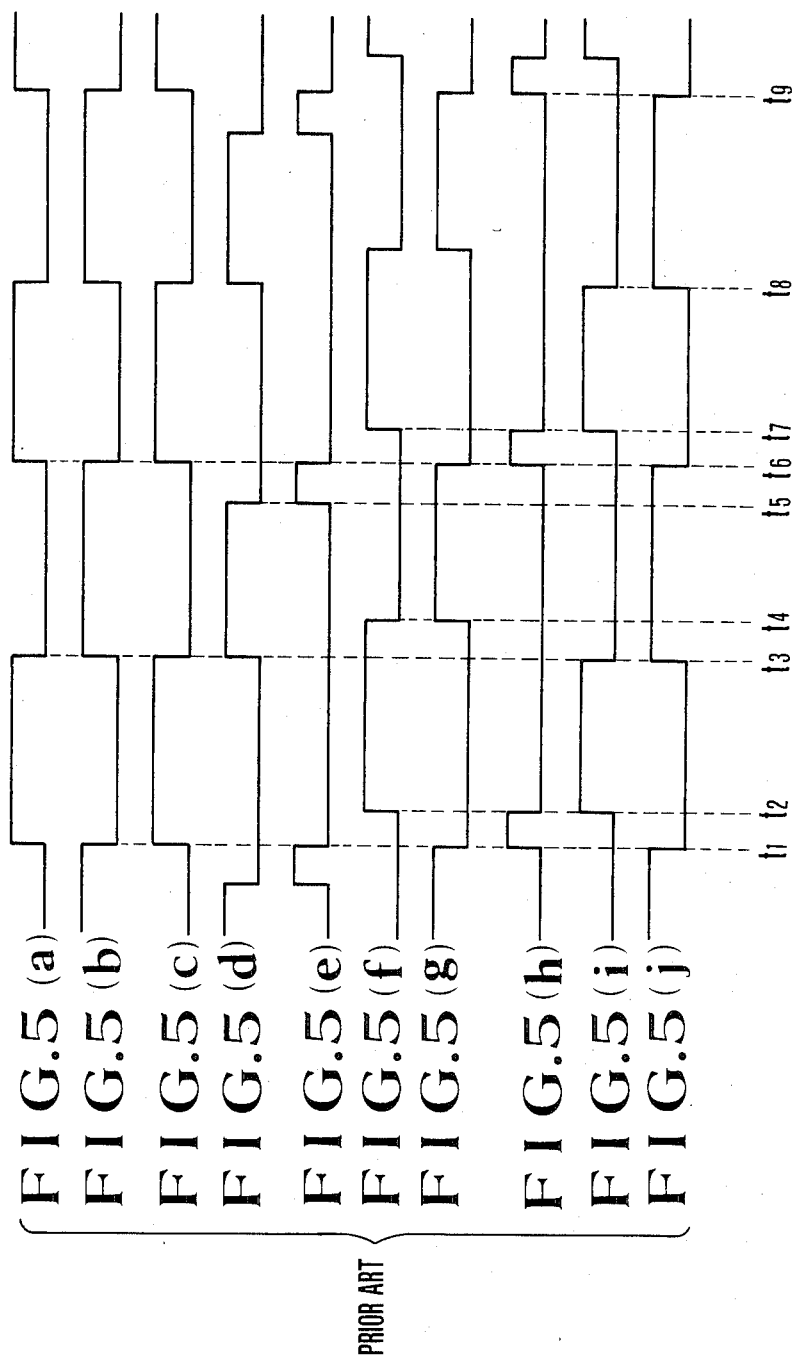
FIGS. 5(a) to 5(j) show in a time chart the recording and reproducing operations performed by the tape recorder shown in FIG. 3.
Figure 6:
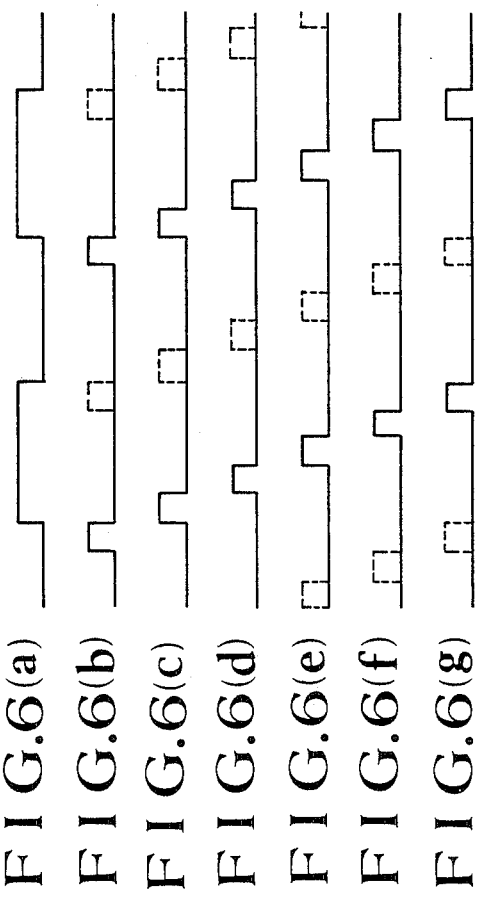
FIGS. 6(a) to 6(g) show in a time chart the phases of window and gate pulses in relation to the PG signal.

Meanwhile, the above-stated PG signal is supplied also to a window pulse generating circuit 16. FIGS. 6(a) to 6(g) show in a timing chart the phasic relation of window and gate pulses to the PG signal. FIG. 6(a) shows the PG signal. The PG signal is at a high level while a head 3 is moving from the point B to the point G of FIG. 3.

FIGS. 6(b) to 6(g) represent window pulses indicating recording and reproducing timings. In FIGS. 6(a) to 6(g), full lines relate to the head 3 and dotted lines to the other head 4.

An operation mode such as a recording or reproducing mode and other modes and an area in or from which recording or reproduction is to be performed can be designated by a manual operation on an operation part 18. The data thus obtained at the part 18 is supplied to a system controller 27 which controls applicable parts of the apparatus. An area designating circuit 19 supplies the area designation data to a gate pulse generating circuit 17 to obtain a desired pulse signal. Further, when an instruction is given for recording or reproduction of a video signal via the operation part 18, the system controller 27 produces an output which causes the area designating circuit 19 to automatically designate use of the area CH1.

The gate pulse generating circuit 17 which controls a gate circuit 20 supplies the circuit 20 selectively with the above-stated window pulses shown in FIGS. 6(b) to 6(g) for each of the heads 3 and 4. Assuming that the area CH2 is designated among others shown in FIG. 4, the gate circuit 20 is controlled with the window pulse of FIG. 6(c).

During recording, an analog audio signal which comes via a terminal 21a is supplied to a PCM audio signal processing circuit 22. The circuit 22 then samples the audio signal at a timing determined by the window pulse of FIG. 6(c) and thus transforms the signal into digital data before the above-stated signal processing operation is carried out. After the signal processing operation, recording audio data thus obtained is supplied to an adder 24 to be subjected to an adding operation together with a tracking control pilot signal generated by a pilot signal generating circuit 23 which generates each of different frequencies f1 to f4 at every one-field period in rotation in the sequence of f1-f2-f3-f4. The output of the adder 24 is suitably gated by the gate circuit 20 to be written in the area CH2 by the heads 3 and 4.

In carrying out reproduction, signals reproduced by the heads 3 and 4 are supplied to the PCM audio signal processing circuit 22 via the gate circuit 20 according to the window pulse of FIG. 6(c). The PCM audio signal processing circuit 22 performs a signal processing operation including error correction, time-base expansion, digital-to-analog conversion, etc. in a manner reverse to the operation performed in recording. The circuit 22 thus produes a reproduced analog audio signal from a terminal 21a.

An ATF circuit 26 is arranged to obtain a tracking error signal by a known four-frequency method. It is well known to obtain the tracking error signal by using a reproduced tracking control pilot signal and a pilot signal generated during reproduction in frequency rotation in the same sequence of frequencies as the sequence employed for recording. In this case, however, the tracking is to be controlled for a specific area designated by the area designated circuit 19. Therefore, the tracking error signal must be sampled and held while the designated area is being traced by the heads 3 and 4. Further, in case where a video signal is also recorded or reproduced concurrently with the audio signal, the tracking error signal is obtained in the same manner as the method conventionally employed.

The tracking error signal which is thus obtained is supplied to a capstan motor control circuit 25. The reproducing travel of the tape 1 is controlled through a capstan 13 for tracking control.

In case that an instruction is given for recording or reproduction of a video signal, the embodiment operates as follows: In recording, a video signal which comes to a terminal 28a is supplied to a video signal processing circuit 29 to be processed in a known manner. After that, the processed video signal is added together with a tracking control pilot signal at an adder 31. The output of the adder 31 is continuously recorded by the heads 3 and 4 one after another through a gate circuit 30 which is under the control of the PG signal. In the case of reproduction, the video signals which are reproduced respectively by the heads 3 and 4 are made into one continuous video signal by the gate circuit 30. The reproduced video signal thus obtained is then supplied to the video signal processing circuit 29. The video signal processing circuit 29 then brings the reproduced video signal back to the original signal form. Meanwhile, a reproduced pilot signal is supplied to the ATF circuit 26 to obtain a tracking error signal. Since this tracking error signal is a continous signal, it it supplied directly to the capstan motor control circuit without any sampling-and-holding process.

A record condition determining circuit 35a is arranged to use the signal reproduced by the head 3 and to find out the situation of each of the areas on the recording tape (or medium) as to the presence of a record of an audio signal or that of a video signal or the absence of these signals.

Figure 8:
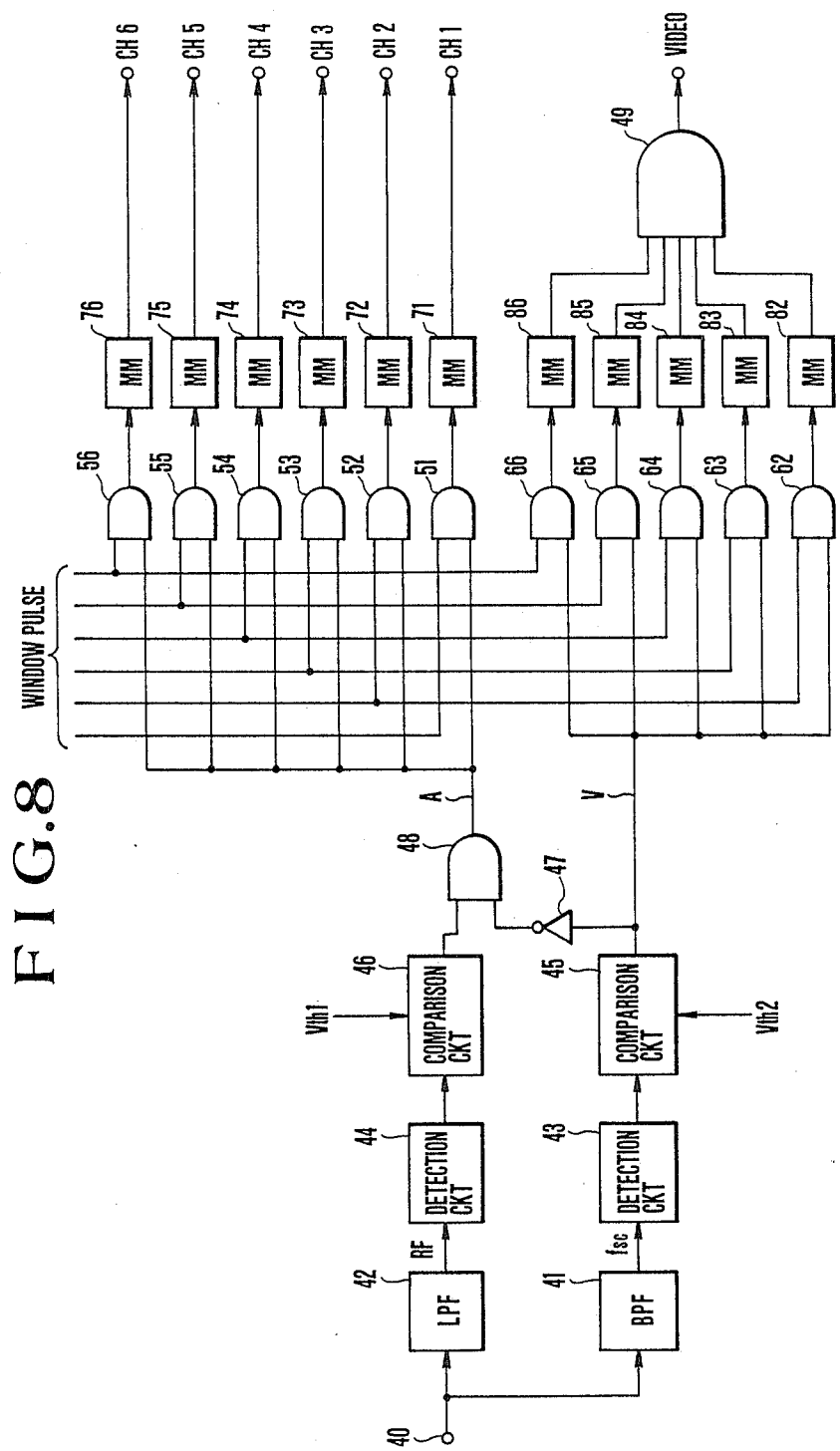
FIG. 8 is a circuit diagram showing by way of example the detials of a record condition determing circuit included in the embodiment shown in FIG. 7.

The details of the record condition determining circuit 35a are as follows: FIG. 8 shows by way of example the arrangement of the circuit 35a. Referring to FIG. 8, a terminal 40 is arranged to receive the signal reproduced by the head 3. This signal is supplied to an LPF 42 and a BPF 41. The BPF 41 is arranged to separate the color subcarrier component (fsc) of the recorded video signal. The color subcarrier which is thus separated is detected by a detection circuit 43. The output of the circuit 43 is compared with a predetermined voltage (Vth2) at a comparison circuit 45. Therefore, the level of the output of the comparison circuit 45 becomes high when the head 3 comes to trace a part where the video signal is recorded.

The LPF 42 is arranged to completely separate the RF signal component included in the signal reproduced by the head 3. The RF signal thus separated is detected by a detection circuit 44 and is then compared with a voltage Vth1 at a comparison circit 46. As a result, the output level of the comparison circuit 46 becomes high when the head 3 comes to trace a part of the recording medium where either the video signal or the audio signal is recorded. The output of the comparison circuit 45 is supplied via an inverter 46 to an AND gate 48. Then, a logical product is obtained at the AND gate 48 from the output of the comparison circuit 45 and that of the comparison circuit 46. Therefore, the output level of the AND gate 48 becomes high when the head 3 traces a part where the audio signal is recorded. In other words, the level of a signal A shown in the drawing becomes high when the head 3 is reproducing the audio signal while that of another signal V becomes high when the head 3 is reproducing the video signal. Meanwhile, the use of the above-stated window pulses permits detection, from among the areas, an area from which these audio and video signals are being reproduced.

The window pulses corresponding to the areas CH1 to CH6 are supplied to AND gates 51 to 56. When a reproduced audio signal is obtained from one of these areas, the AND gate which corresponds to this area produces a high level output every time the revolving head 3 makes one turn. Meanwhile, the window pulses which correspond to the areas CH2 to CH6 are also supplied to AND gate 62 to 66. When a reproduced video signal is obtained from one of these areas, applicable one of the AND gates 62 to 66 produces a high level output every time the head makes one turn. In this instance, the area CH1 is assumed to be not used for recording and reproducing a video signal.

Monostable multivibrators (hereinafter referred to as MM's for short) 71 to 76 and 82 to 86 are arranged for holding the output signals of the AND gates 51 to 56 and 62 to 66 respectively. The high level output of each of these output signals is arranged to be kept high over such a period of time that permits re-triggering of the MM's at an interval longer than the revolution cycle of the head 3. Such being the arrangement, among the areas Ch1 to CH6, any area that has an audio signal recorded therein can be found by a change of the output level of one of terminals CH1 to CH6 shown in FIG. 8 to a high level. Further, among the areas CH2 to CH6, any area that has a video signal recorded therein can be found through the outputs of the MM's 82 to 86. However, since a video signal becomes effectively usable only when it is recorded in all of the areas CH2 to CH6, a discrimination between the presence and absence of an effective record of a video signal can be made according to the logical product of the outputs of these MM's 82 to 86. In other words, the presence of an effective record of a video signal is determined when the output of the AND gate 49 is at a high level.

Figure 9:
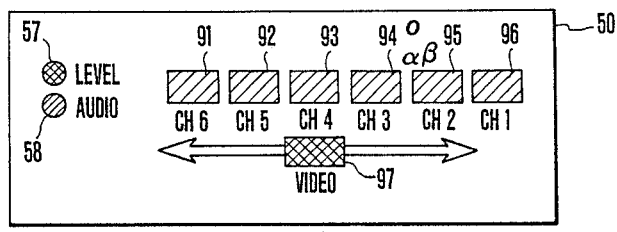
FIG. 9 is a circuit diagram showing by way of example the details of a display device included in the embodiment shown in FIG. 7.

The outputs which are indicated by reference symbols CH1 to CH6 and VIDEO in FIG. 8 are arranged to be supplied to the display device 36 of FIG. 7. The details of this display device are as shown in FIG. 9. Referring to FIG. 9, the illustration includes a display plate 50, display elements 91 to 96 which are arranged to show the high level state of applicable one of the outputs CH1 to CH6 of FIG. 8; another display element 97 which is arranged to show that the output VIDEO of FIG. 8 is at a high level. While the record condition of each area is not being detected, the display device 36 serves to function as the so-called digital meter. In other words, the display elements 91 to 96 are arranged to be driven according to the level of the reproduced audio signal. The details of the level meter are well known and, therefore, do not require further description herein. Further, in case where the display elements 91 to 96 are used as the level meter, a display element 57 lights up. Another display element 58 is arranged to light up when they are showing the record condition of an audio signal.

The arrangement of the embodiment described above permits prompt detection of the situation of each of the six different areas as to whether an audio signal is recorded or a video signal is recorded or not signal is recorded. In addition to that, the display arrangement makes the embodiment very easily operatable for the operator. Further, the preferred arrangement to have the display elements perform combined functions of displaying the record condition and serving as a level meter prevents the display device from becoming complex and the apparatus from becoming larger in size.

Figure 10:
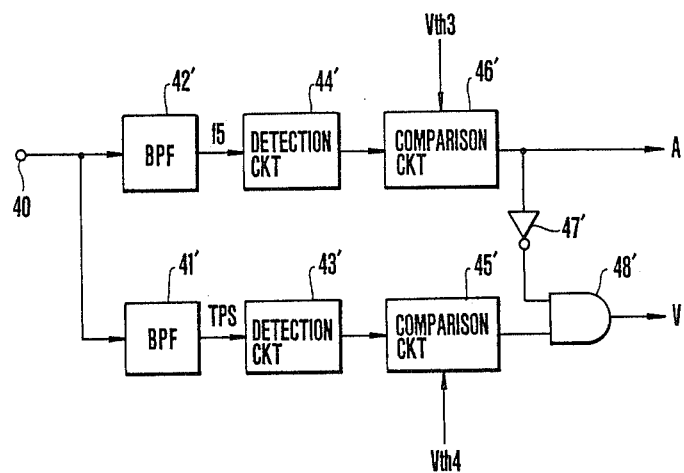
FIGS. 10 and 11 are diagrams respectively showing examples of modification of the arrangement of the record condition determing circuit of FIG. 8.
Figure 11:
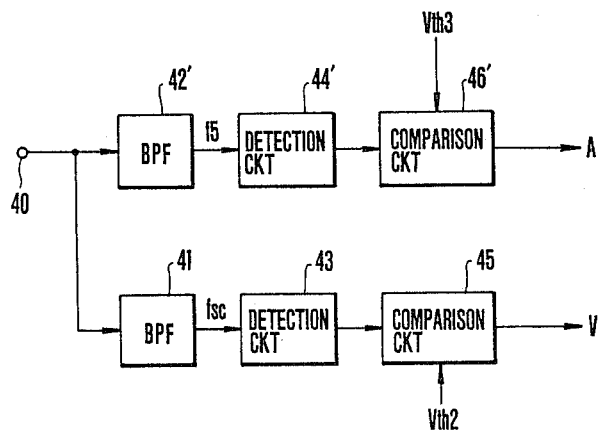

FIGS. 10 and 11 show examples of modification of the record condition determining circuit 35a. In these cases, the circuit 35a is modified on the assumption that the PCM audio signal includes some pilot signal which has another frequency fs in addition to the tracking control pilot signals (TPS's) having the above-stated different frequencies f1 to f4. In the modification example of FIG. 10, a BPF 42' is arranged to separate the frequency fs component. A BPF 41' is arranged to separate the TPS's (of frequencies f1 to f4). Detection circuits 43' and 44' and comparison circuits 45' and 46' are arranged to operate in the same manner as the circuits 43, 44, 45 and 46 shown in FIG. 8. Comparison circuits 46' and 45' are arranged to use level values Vth3 and Vth4 for comparison. The comparison circuit 46' produces a high level output when the head 3 is reproducing an audio signal. The other comparison circuit 45' produces a high level output when the head 3 is reproducing either an audio signal or a video signal. The output of the comparison circuit 46' is supplied via an inverter 47' to an AND gate 48'. The output level of the AND gate 48' becomes high when the head 3 is reproducing the video signal. The modification is thus arranged to give the same signals A and V as those of FIG. 8.

In FIG. 11, the same component elements as those shown in FIG. 8 or FIG. 10 are indicated by the same reference numerals. The comparison circuit 45 produces the signal V and the comparison circuit 46' the signal A in the same manner as the example described above. Therefore, the details of this modification example do not require further description. It goes without saying that the same advantageous effect as the embodiment mentioned in the foregoing is attainable by the arrangement of the modification examples shown in FIGS. 10 and 11.

In the embodiment described, the display is made only when the video signal is recorded in an effective state for the convenience of the operator. However, to make a display for each of the areas gives the same advantageous effect.

The arrangement to make the display may be replaced with some arrangement that inhibits recording.

FIG. 12 shows in outline the arrangement of a tape recorder which is arranged to this invention as another embodiment thereof. In FIG. 12, the same component elements as those shown in FIGS. 1 to 4 and 7 are indicated by the same reference numerals. A CRCC condition determining circuit 37 is arranged to detect, by using a known CRCC check code, the presence or absence of an error in each data block of the PCM audio signal and to determine whether the rate of a block error thus detected is larger or smaller than a predetermined error rate.

In the PCM audio signal, a cyclic code called CRCC is added beforehand to the recording data for the purpose of detecting and correcting during reproduction any error which might occur on the recording medium. The recording data of the PCM audio signal corresponding to the one-field period of the video signal is divided into 132 blocks in the case of the NTSC system and into 157 blocks in the case of the CCIR system. The cyclic code CRCC is added to each of these blocks.

During reproduction, the result of computation on the cyclic code CRCC becomes "0" when no error is added to the data reproduced. The code CRCC is computed as data other than "0" if an error has been added to the data reproduced. The code CRCC is arranged to be computed in such a manner as to have the apparatus seldom make erroneous detection for an added error. Therefore, the probability that the data train computed as "0" by the CRCC computation coincides with the original data train used for recording is very high. Besides, when a signal part including a video signal which greatly differ in spectrum from the original data train is received that the PCM reproduced signal processing circuit, it is much less probable that it is erroneously detected as a correct data train.

Figure 13:
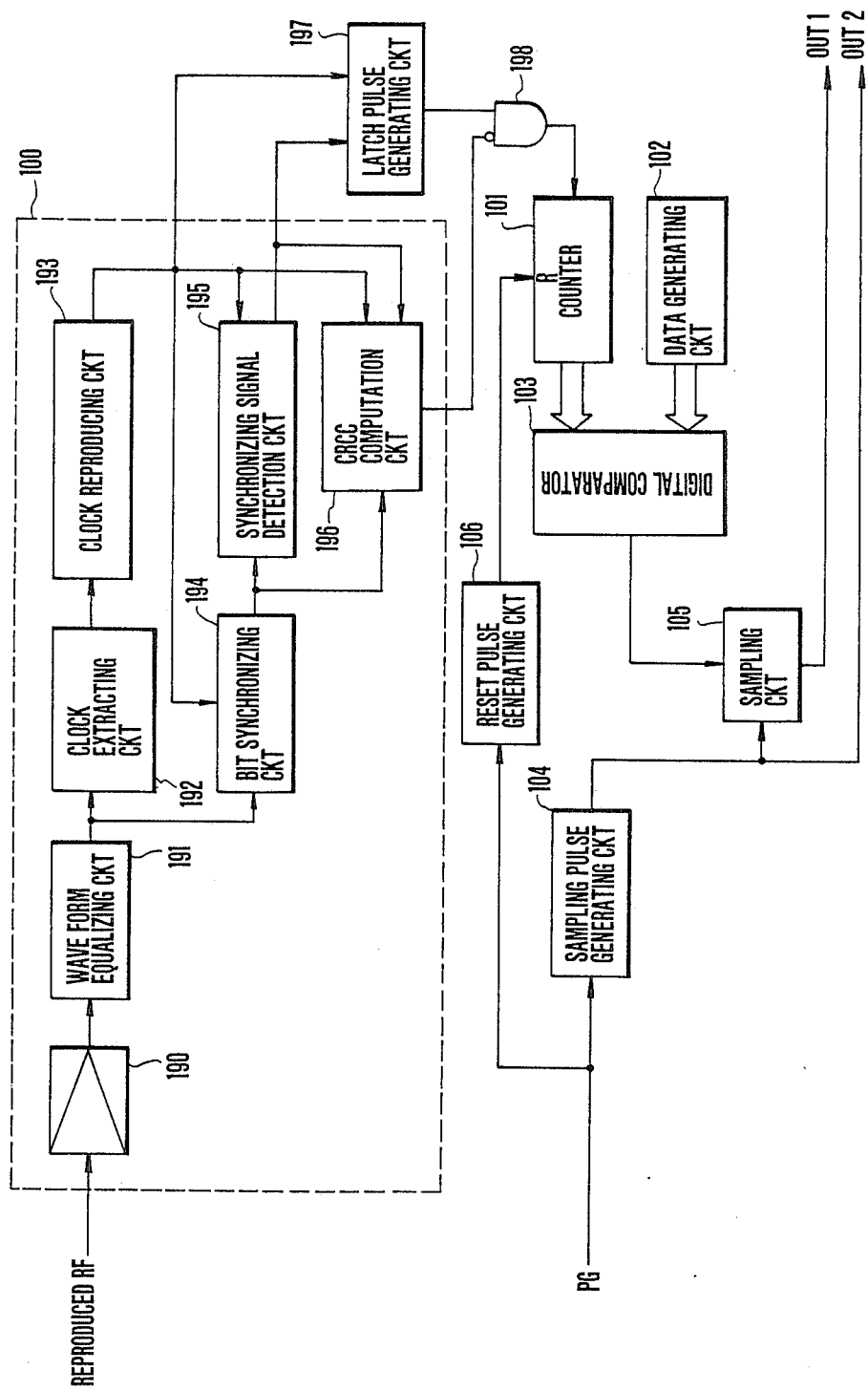
FIG. 13 is a circuit diagram showing by way of example the details of a CRCC condition determing circuit included in the embodiment shown in FIG. 12.

FIG. 13 shows by way of example the details of arrangement of the CRCC condition determining circuit 37 shown in FIG. 12. Referring to FIG. 13, an amplifier 190 is arranged to amplify an RF signal reproduced by the head 3. A reference numeral 191 denotes a wave form equalizing circuit. A clock component extracting circuit 192 is arranged to extract a clock component from the PCM audio signal output obtaind from the wave form equalizing circuit 191. A clock reproducing circuit 193 is arranged to newly generate control clock pulses on the basis of the clock component extracted by the extracting circuit 192. A bit synchronizing circuit 194 is arranged to restore the data of each bit to its original state on the basis of the control clock pulses. A synchronizing signal detection circuit 195 is arranged to detect the synchronizing signal. A numeral 196 denotes a known CRCC computation circuit.

Generally, the result of a CRCC computation becomes effective solely with the last bit obtained when the CRCC of the incoming data is examined. Therefore, with an output "0" assumed to be obtained from the CRCC computation circuit 196 when the result of the CRCC computation is correct, the output is gated at a logic gate 198 according to a latch pulse and is supplied to a counter 101. The counter 101 is arranged to up count every time "no error" information is received there. If no error has occurred in all the data blocks, the up count of the counter 101 continues up to 132 in the case of the NTSC system and 157 in the case of the CCIR system. A rest pulse generating circuit 106 is arranged to operate on the basis of the PG signal. The counter 101 is reset by a reset pulse produced from the reset pulse generating circuit 106 every time the head 3 enters one of the areas.

Meanwhile, a data generating circuit 102 is arranged to generate a given number of data which is, for example, 30 or thereabout in the case of the NTSC system and 40 or thereabout in the case of the CCIR system. A digital comparator 103 is arranged to produce a high level output when the counter 101 counts more than the above-stated number of data. This digital comparator 103 may be replaced with an OR gate which is arranged to produce a high level output when any of the data at the sixth bit and bits higher than the six bit of the counter 101 happens to be at "1". In this case, the data from the data generating circuit 102 is arranged to be equivalent to 32.

A sampling pulse generating circit 104 is arranged to generate according to the PG signal a sampling pulse at a given timing while the head 3 is tracing each of the above-stated areas. In this specific embodiment, this timing is arranged to be a point of time when the head 3 traces the middle part of each area. This sampling pulse is gated at a sampling circuit 105 according to the output of the digital comparator 103 and the gated pulse is produced as an output OUT1. Meanwhile, a nongated sampling pulse from the sampling pulse generating circuit is produced as an output OUT2. In case that the sampling pulse is produced at the output OUT1, it can be determined that a PCM audio signal is recorded in the area being traced. If the sampling pulse is not produced, it indicates that no PCM audio signal is recorded there.

A record condition determining circuit 35b is arranged to find the presence of an existing record of an audio signal or a video signal or the absence of such a record according to the reproduction output of the head 3 and the output of the above-stated CRCC condition determining circuit 37.

Figure 14:
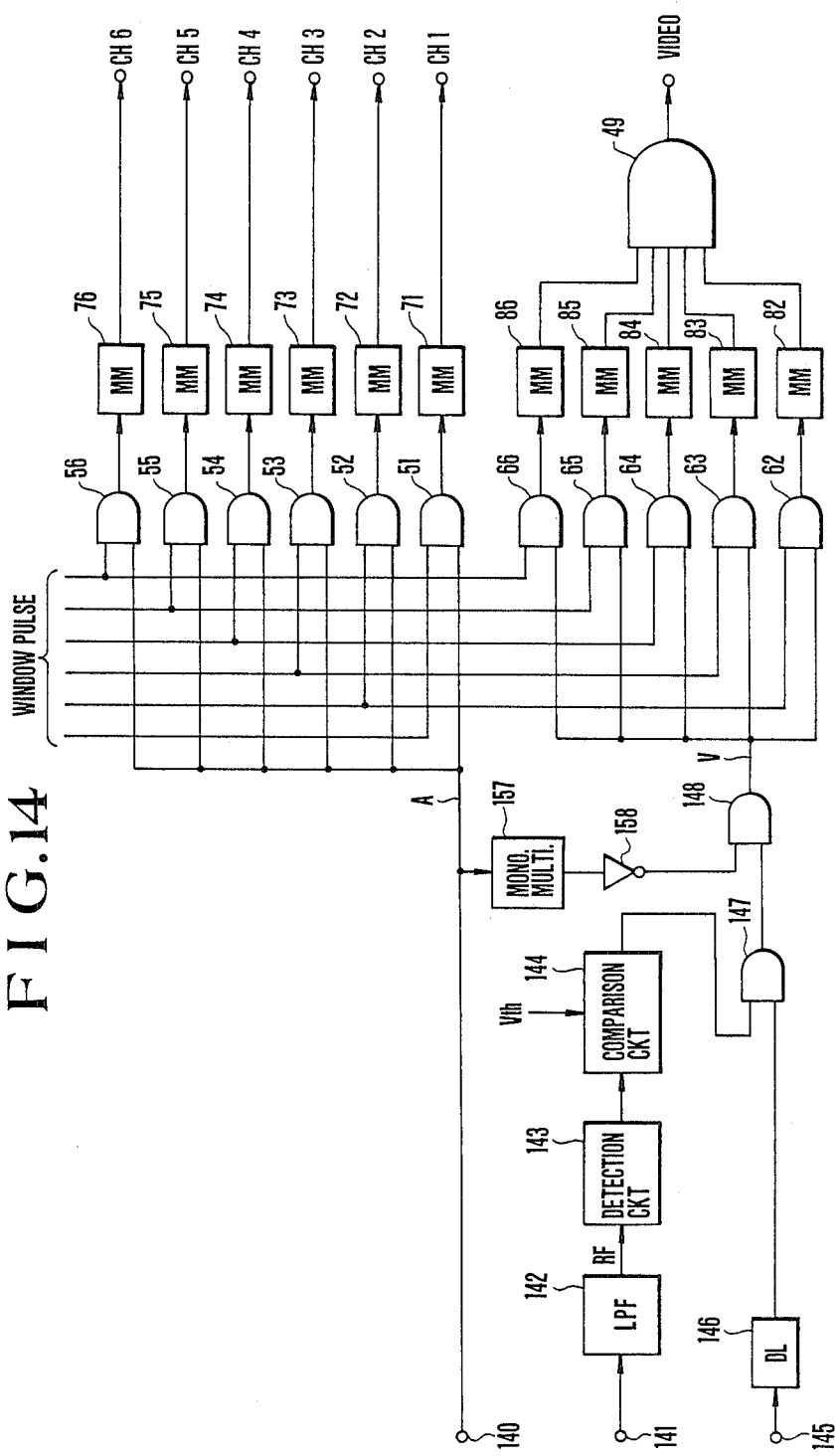
FIG. 14 is a circuit diagram showing by way of example the details of a record condition determing circuit included in the embodiment shown in FIG. 12.

FIG. 14 shows an example of the details of the record condition determining circuit 35b shown in FIG. 12. The same component elements as those shown in FIG. 8 are indicated by the same reference numerals. A terminal 140 is arranged to receive the outpout OUT1 of the CRCC condition determining circuit 37. A terminal 141 is arranged to receive the signal reproduced by the head 3. A terminal 145 is arranged to receive the output OUT2 of the circuit 37. The signal reproduced by the head 3 is supplied to an LPF 142. The LPF 142 is arranged to take out the RF signal component from the reproduced signal. The RF signal which is thus taken out is subjected to a detection process performed by a detection circuit 143. After the detection process, the RF signal is supplied to a compression circuit 144 to be compared with a predetermined voltage Vth. The output level of the comparison circuit 144 becomes high when the head 3 traces a part where the PCM audio signal is recorded.

The above-stated sampling pulses which are received at the terminal 145 are somewhat delayed by a delay circuit 146. After that, the sampling pulses are supplied to an AND gate 147 to be gated according to the output of the above-stated comparison circuit 144. Of these delayed sampling pulses, the pulses relative to an area in which the PCM audio signal is recorded are muted by another AND gate 148. In other words, a monostable multivibrator (MM) 157 is triggered by the sampling pulse of the PCM audio signal recorded area; and the output level of an inverter 158 becomes low for a period of time including the timing at which the sampling pulse is produced from the AND gate 147.

In FIG. 14, a signal A is the pulse signal representing the area from which the head 3 is reproducing the PCM audio signal. A signal V is a pulse signal representing an area from which the head 3 is reproducing a video signal. With the above-stated window pulses employed, the areas from which the audio and video signals are being reproduced can be detected from these pulse signals in the same manner as in the case of the preceding embodiment shown in FIG. 8. The outputs CH1 to CH6 and VIDEO of the determining circuit 35b are displayed at a display device 36 are applicable. This arrangement of the embodiment enables the operator to know without fail in which of the channels the digital audio signal is recorded without having any additional identification signal superimposed on the signal.

In the embodiment described above, a PCM audio signal is taken up by way of example as the digital information signal. However, this invention is also advantageously applicable to other signals such as a digital picture signal, letter signal, etc.

In the CRCC condition determining circuit 37 described in the foregoing, the element indicated by a block 100 is normally also included in a PCM audio signal reproduction processing circuit. Therefore, the CRCC condition determining circuit 37 may be arranged to utilize this circuit. However, in that instance, since this PCM audio signal reproduction processing circuit is provided for producing a reproduced audio signal for every field and the CRCC computation circuit works only for some specific area, the method for supplying the control clock pulses must be modified in some suitable manner. Then, detection of the recorded situations of all the area while the head 3 makes one turn becomes impossible. However, this problem can be solved by allowing the head 3 to make six turns.

Figure 15:
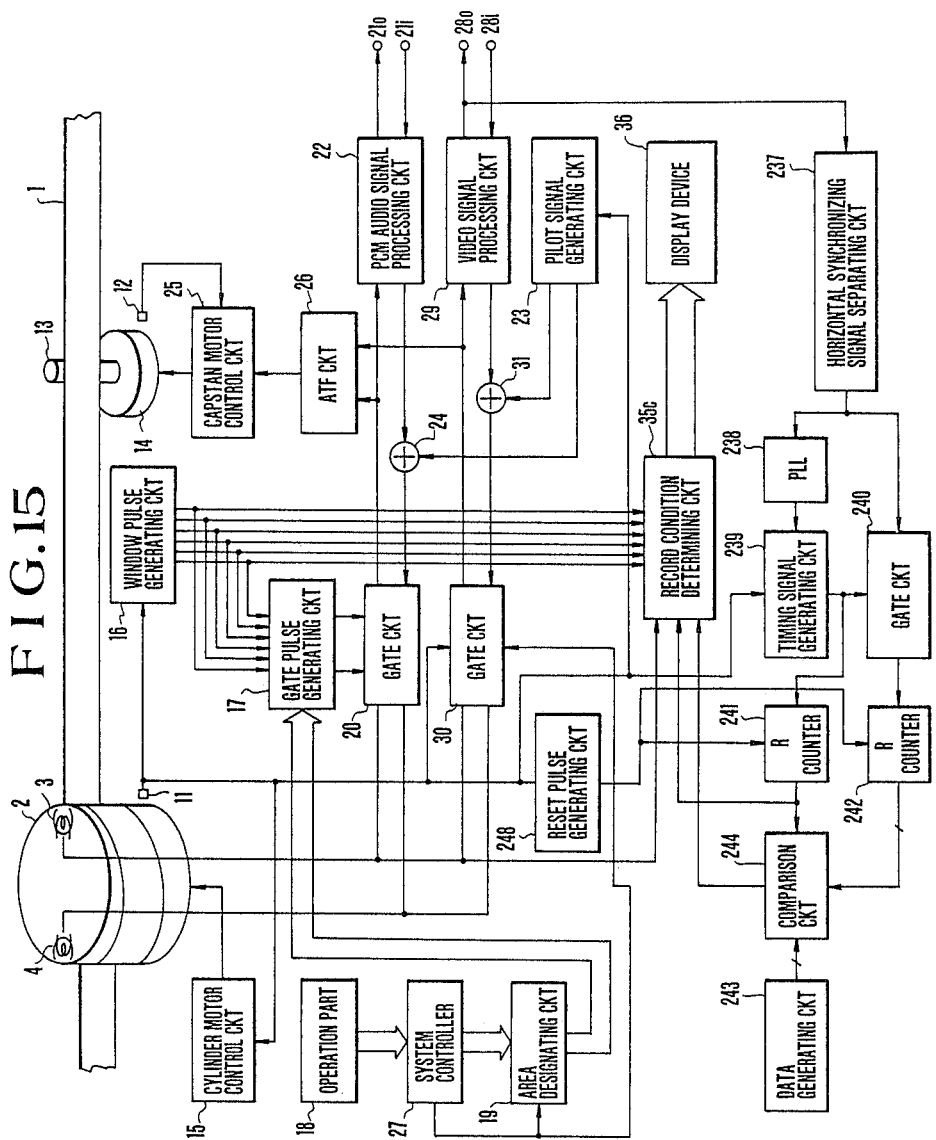
FIG. 15 is a diagram showing in outline the arrangement of a tape recorder arranged as a further embodiment of this invention.
Figure 16:
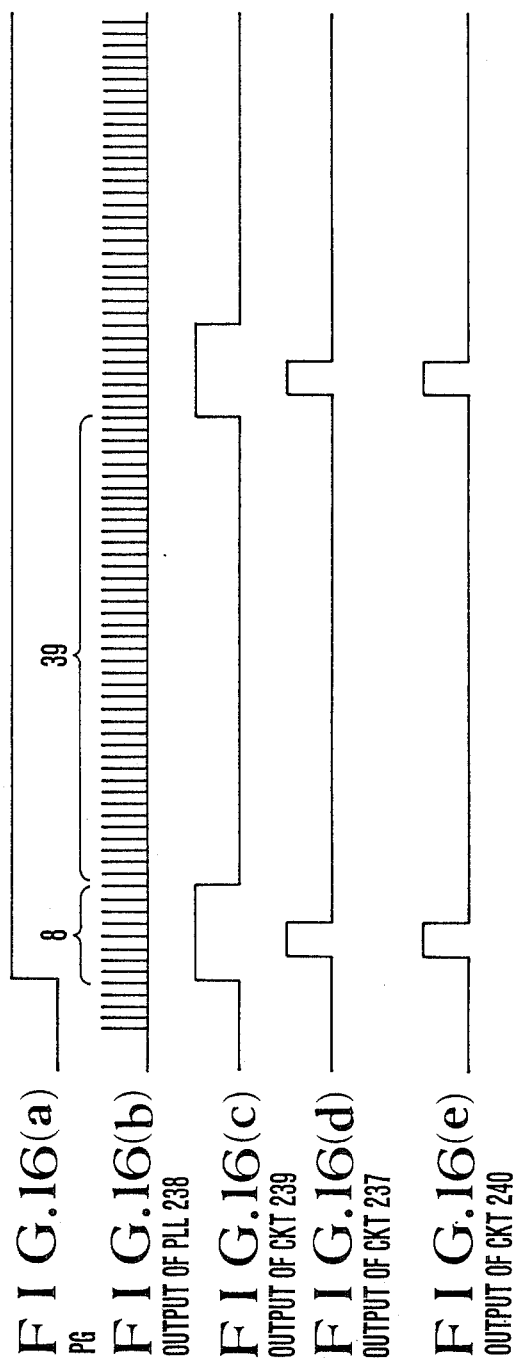
FIGS. 16(a) to 16(e) show in a time chart the operation of the embodiment shown in FIG. 15.

FIG. 15 shows in outline the arrangement of a tape recorder as a further embodiment of this invention. In FIG. 15, the same components that are shown also in FIG. 7 or FIG. 12 are indicated by the same reference numerals and the details of them are omitted from the following description. FIGS. 16(a) to 16(e) show in a timing chart the operation of the tape recorder of FIG. 15. Referring to these drawings, the tape recorder operates as follows: A horizontal synchronizing signal included in a reproduced video signal which is produced at a terminal 28o is separated by a known horizontal synchronizing signal separating circuit 237. The separated signal is supplied to a PLL circuit 238 and a gate circuit 240. At the PLL circuit 238, a signal of a given frequency of, say, 740 Hz or thereabout as shown in FIG. 16(b) is generated in synchronism with the horizontal synchronising signal, which is as shown in FIG. 16(d). The signal thus generated is supplied to a timing signal generating circuit 239. At the timing signal generating circuit 239, a timing at which a horizontal synchronizing signal is expected to be generated after the rise of the PG signal is predicted from the output of the PLL circuit 238. Then, with some allowance given to that predicted timing, the timing signal generating circuit 239 supplies a gate circuit 240 and a counter 241 with gate timing pulses as shown in FIG. 16(c). This arrangement is on the assumption that the head 3 is performing reproduction always for odd-numbered fields. The gate circuit 240 is arranged to gate the above-stated horizontal synchronizing signal. The horizontal synchronizing signal which is gated by the gate circuit 240 is counted by the counter 242. A reset pulse generating circuit 248 is arranged to generate a reset pulse at a point of time when the head 3 enters each of the areas. The reset pulse is supplied to the reset terminals of counters 241 and 242. Accordingly, these counters 241 and 242 are reset when the heand 3 enters each of the areas.

On counting eight gate timing pulses mentioned above, the counter 241 supplies a sampling pulse signal to a comparison circuit 244 and a record condition determining circuit 35c. This pulse signal renders the comparison circuit 244 operative. The circuit 244 then compares the data generated by a data generating circuit 243 with the output of the counter 242. The data to be generated by the data generating circuit 243 is set to be between 4 and 6 of thereabout. In case that a video signal is being reproduced by the head 3, the counted value of the counter 242 is 8 if there is no drop-out and is at least 6 even in the event of one or two drop-outs. When the count data of the counter 242 is greater than the data generated by the circuit 243, the comparison circuit 244 supplies the record condition determining circuit 35c with a high level signal at the same timing as the above-stated sampling pulse signal which is obtained from the counter 241.

The timing at which the sampling pulse signal is to be generated from the counter 241 is arranged to be at a point of time when eight timing pulses have been counted, because: This is immediately after each area begins to be traced. In case that a PCM audio signal is recorded in that area, this part is a signal of a fixed frequency called a blank or clock line. Hence, during a period from the head of each area and a point at which the sampling pulse is generated, the probability of any erroneous operation of the horizontal synchronising signal separating circuit 237 is extremely small, so that any existing record of a video signal can be detected without fail. Therefore, when a pulse is produced from the comparison circuit 244 in synchronism with the sampling pulse, the area can be regarded as having an existing record of the video signal. If no pulse is produced, it can be determined as having no existing record of any video signal.

The record condition determining circuit 35c is arranged to use the reproduction outpout of the head 3, the pulse output of the comparison circuit 244, etc. in determining as to whether there is an existing record of a video signal or a PCM audio signal or no record of these signals in each of the areas on the recording medium.

FIG. 17 shows by way of example the details of arrangement of the record condition determining circuit 35c. The same component elements as those shown in FIG. 8 are indicated by the same reference numerals. The illustration includes a terminal 245 receiving a reproduction output signal of the head 3; a terminal 246 receiving the sampling pulse signal coming from the counter 241; and a terminal 247 receiving the pulse signal produced from the comparison circuit 244. An LPF 257 is arranged to take out the RF signal component of the reproduced signal. The RF signal thus taken out is subjected to a detection process performed by a detection circuit 258. The signal is then compared at a comparison circuit 259 with a predetermined threshold voltage value Vth. The output level of the comparison circuit 259 becomes high when the head 3 traces an area having an existing record of either a video signal or a PCM audio signal.

The sampling pulse signal which comes via the terminal 246 is delayed at a delay circuit 267 for a period of approximately 20 horizontal scanning periods before it is supplied to an AND gate 268. The sampling pulse signal is then gated according to the output of the comparison circuit 259. Amount the delayed sampling pulses produced from the AND gate 268, the pulses corresponding to an area having an existing record of a video signal is muted by another AND gate 269. In other words, a monostable multivibrator (MM) 277 is triggered by the sampling pulse corresponding to the area having the existing record of the video signal. Assuming that the inverted period of the output of this MM 277 is 30 horizontal scanning periods, the output level of an inverter 278 becomes low at a point of time when the pulse is produced from the AND gate 268. Such being the arrangementt, a signal A is shown in FIG. 17 is the pulse signal corresponding to an area from which the head 3 is reproducing an audio signal. Another signal indicated by a reference symbol V is a pulse signal corresponding to an area from which the head 3 is reproducing a video signal. With the window pulses arranged as described in the foregoing, these pulse signals A and V enable the record condition determining circuit 35c to find out the areas from the audio and video signals are being reproduced in the same manner as in the case of FIG. 8.

In the specific embodiment given above, the horizontal synchronizing signal separating circuit 237 is provided separately from a video signal processing circuit. However, it is of course possible to attain the same purpose by utilizing a horizontal synchronizing signal separating circuit which is included in the reproduced video signal processing circuit instead of separately arranging the circuit 237. Further, a signal processing system using a so-called APC color processing circuit includes a known AFC circuit which is arranged to generate a frequency signal in a state of being locked to the horizontal synchronizing signal. Therefore, use of this frequency signal in place of the output of the PLL circuit 238 permits further simplification of the circuit arrangement.

What is claimed is:

1. An information signal recording and/or reproducing apparatus comprising:
    (a) transducing means for recording and/or reproducing a signal in or from a given area provided on a recording medium;
    (b) first detecting means arranged to receive a signal reproduced from said given area by said transducing means for detecting an existing record of either a first information signal which includes a video signal or a second information signal which includes an audio signal within said given area, said first detecting means producing a first binary signal;
    (c) second dedtecting means arranged to receive said signal reproduced from said given area by said transducing means for detecting an existing record of said second information signal within said given area, said second detecting means producing a second binary signal; and (d) discriminating means for discriminating the situation of said given area so as to the presence or absence of an existing record of said first information signal on the basis of said first and second binary signals.

2. An apparatus according to claim 1, wherein said second information signal includes a reference signal of a given frequency; and said second detecting means includes means for separating said reference signal from said signal reproduced by said transducing means.

3. An apparatus according to claim 1, wherein said second information signal is composed of a group of data including audio data which relates to said audio signal and redundant data to be used for error detection.

4. An apparatus according to claim 3, further comprising error detection means for detecting the code error of said group of data by using said redundant data.

5. An apparatus according to claim 4, wherein said second detecting means includes means for computing the error rate of said group of data by using the output of said error detection means.

6. An apparatus according to claim 5, wherein said second detecting means further includes comparison means for comparing an error rate computed by said computing means with a predetermined rate.

7. An apparatus according to claim 1, wherein said recording medium is of a tape-like shape, and said given area is one of an "n" number of parallel extending areas extending on said tape-shaped medium in the longitudinal direction of said medium, said "n" being $n \geq 2$.

8. An apparatus according to claim 7, wherein said transducing means includes a rotating head which is arranged to trace the surface of said recording medium across said "n" number of areas; said first information signal is recorded and/or reproduced by said transducing means in or from an "m" number of areas among said "n" number of areas, and said second information signal is recorded and/or reproduced by said transducing means in or from one of said "n" number of areas, said "n" and "m" being in a relation of $n \geq m \geq 2$.

9. An apparatus according to claim 8, further comprising first display means for making a display showing the presence or absence of an existing record of said second information signal in each of said "n" number of areas on the basis of the output of said second detecting means.

10. An apparatus according to claim 9, wherein said first display means includes at least an "n" number of display elements.

11. An apparatus according to claim 9, further comprising second display means for making a display showing the presence or absence of an existing record of said first information signal in all of said "m" number of areas on the basis of the output of said discriminating means.

12. An apparatus according to claim 9, whrein said first display means is capable of making a display relative to the level of said audio signal.

13. An apparatus according to claim 1, wherein said first detecting means includes level detecting means for detecting the level of a signal reproduced by said transducing means.

14. An apparatus according to claim 1, wherein said first information signal and said second information signal respectively include tracking control pilot signals; and said first detecting means includes means for detecting said pilot signals.

15. An information signal recording and/or reproducing apparatus comprising:
(a) transducing means for recording and/or reproducing a signal in or from a given area provided on a recording medium;
(b) first detecting means arranged to receive a signal reproduced from said given area by said transducing means for detecting an existing record of either a first information signal which includes an analog information or a second information signal which includes a digitial information within said given area, said digital information including main information data and redundant data to be used for error detection, said first detecting means producing a first binary signal;
(c) error detecting means for detecting, by using said redundant data, any code error of the digital information included in said second information signal reproduced by said transducing means;
(d) second detecting means for detecting the presence of an existing record of said second information signal in said given area by using the outout of said error detecting means, said second detecting means producing a second binary signal; and
(e) discriminating means for discriminating, on the basis of said first and second binary signals, the situation of said given area as to the presence or absence of an existing record of said first information signal.

16. An information signal recording and/or reproducing apparatus comprising:
(a) transducing means for recording and/or reproducing an information signal in or from a given area on a recording medium, said information signal including digital information consisting of main information data and error correcting redundant data;
(b) error detecting means for detecting, by using said redundant data, any code error of the digital information included in said information signal reproduced by said transducing means; and
(c) discriminating means for discriminating, by using the output of said error detecting means, the presence or absence of an existing record of said information signal, said discriminating means including means for computing a code error probability of said digital information included in said information signal reproduced by said transducing means, said computing means being arranged to use the output of said error detecting means in computing said code error probability.

17. An apparatus according to claim 16, wherein said computing means includes counting means for counting the number of data having no code error and storing means for storing a counted number counted by said counting means with a given period.

18. An apparatus according to claim 17, wherein said discriminating means further includes comparison means for comparing the data stored at said storing means with a predetermined data.

19. An information signal recording and/or reproducing apparatus comprising:
(a) transducing means for recording and/or reproducing a signal in or from a given area on a recording medium;
(b) first detecting means arranged to receive a signal reproduced from said given area by said transducing means for detecting an existing record of either a first information signal which includes a video signal or a second information signal which does not include any video signal, said first detecting means producing a first binary signal;

(c) second detecting means for detecting the synchronizing signal of said video signal included in said first information signal reproduced by said transducing means;

(d) third detecting means for detecting, by using the synchronizing signal produced by said second detecting means, an existing record of said first information signal within said given area, said third detecting means producing a second binary signal; and (e) discriminating means for discriminating, by using said first and second binary signals, the presence or absence of an existing record of said second information signal within said given area.

20. An apparatus according to claim 19, wherein said second detecting means includes a circuit which is arranged to separate horizontal synchronizing signals included in said video signal.

21. An apparatus according to claim 20, wherein said second detecting means includes a counting circuit which is arranged to count the number of said horizontal synchronizing signals separated by said separating circuit within a predetermined period.

22. A video signal recording and/or reproducing apparatus comprising:

(a) transducing means for recording and/or reproducing a video signal in or from a given area on a recording medium;

(b) separating means for separating horizontal synchronizing signals included in said video signal reproduced by said transducing means;

(c) counting means for counting the number of said horiziontal synchronizing signals separated by said separating means;

(d) storing means for storing information on the number of said horizontal synchronizing signals counted by said counting means within a given period of time;

(e) discriminating means for discriminating the presence or absence of an existing record of said video signal within said given area on the basis of said information stored by said storing means.

23. An apparaus according to claim 22, wherein said discriminating means includes comparison means for comparing the data stored by said storing means with predetermined data.

24. An apparatus according to claim 22, wherein said given period of time relates to the vertical scanning period of said video signal.

* * * * *